(12) United States Patent
Heo et al.

(10) Patent No.: US 9,049,720 B2
(45) Date of Patent: Jun. 2, 2015

(54) METHOD AND APPARATUS FOR SIMULTANEOUSLY PERFORMING FREQUENCY RESOURCE SENSING AND DATA TRANSMISSION IN A WIRELESS COMMUNICATION SYSTEM

(71) Applicants: LG Electronics Inc., Seoul (KR); Industry-Academic Cooperation Foundation, Yonsei University

(72) Inventors: Jihaeng Heo, Seoul (KR); Daesik Hong, Seoul (KR); Kijun Kim, Anyang-si (KR); Eunsun Kim, Anyang-si (KR)

(73) Assignees: LG Electronics Inc., Seoul (KR); Industry-Academic Cooperation Foundation, Yonsei University, Seoul (KR)

( * ) Notice: Subject to any disclaimer, the term of this patent is extended or adjusted under 35 U.S.C. 154(b) by 98 days.

(21) Appl. No.: 13/953,088

(22) Filed: Jul. 29, 2013

(65) Prior Publication Data

US 2014/0029516 A1 Jan. 30, 2014

Related U.S. Application Data

(60) Provisional application No. 61/677,009, filed on Jul. 30, 2012, provisional application No. 61/749,849, filed on Jan. 7, 2013.

(51) Int. Cl.
*H04W 72/04* (2009.01)
*H04W 16/32* (2009.01)
*H04W 24/02* (2009.01)
*H04W 72/00* (2009.01)
*H04W 84/04* (2009.01)

(52) U.S. Cl.
CPC .......... *H04W 72/0453* (2013.01); *H04W 72/00* (2013.01); *H04W 84/045* (2013.01); *H04W 16/32* (2013.01); *H04W 24/02* (2013.01)

(58) Field of Classification Search
None
See application file for complete search history.

(56) References Cited

U.S. PATENT DOCUMENTS

| 2010/0062718 | A1* | 3/2010 | Zhou et al. | 455/67.11 |
| 2012/0289236 | A1* | 11/2012 | Xu et al. | 455/446 |
| 2012/0294168 | A1* | 11/2012 | Freda et al. | 370/252 |
| 2013/0121249 | A1* | 5/2013 | Ji et al. | 370/328 |

* cited by examiner

*Primary Examiner* — Hicham Foud
(74) *Attorney, Agent, or Firm* — McKenna Long & Aldridge LLP

(57) ABSTRACT

In order to simultaneously perform frequency resource sensing and data transmission, a pico base station (BS) within the coverage of a macro BS may determine the number of antennas for frequency band sensing and/or the number of antennas for data transmission and reception from among a plurality of antennas of the pico BS. The pico BS may also determine the duration of the frequency band sensing in a radio frame. The pico BS could then perform frequency band sensing, for the determined duration, or data transmission and reception according to the determined number of antennas for frequency band sensing and/or the determined number of antennas for data transmission. The duration of frequency band sensing and the number of antennas for frequency band sensing and data transmission may be determined based on the data throughput of the pico BS.

12 Claims, 14 Drawing Sheets

FIG. 12
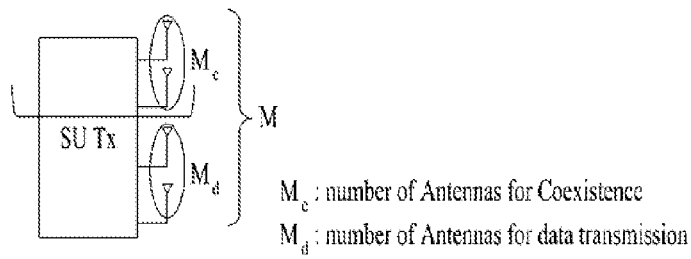
(a)
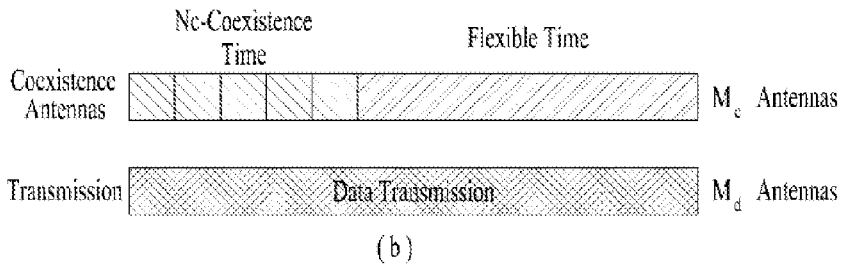
(b)
FIG. 13
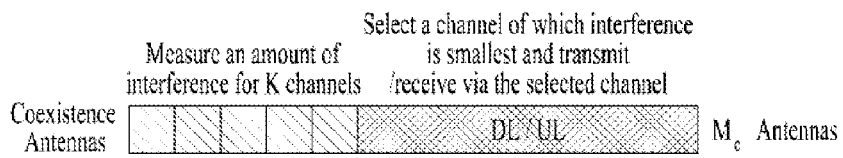
(a)
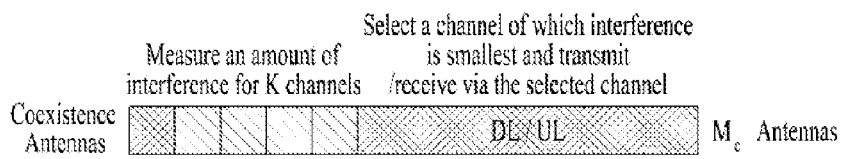
(b)

FIG. 16
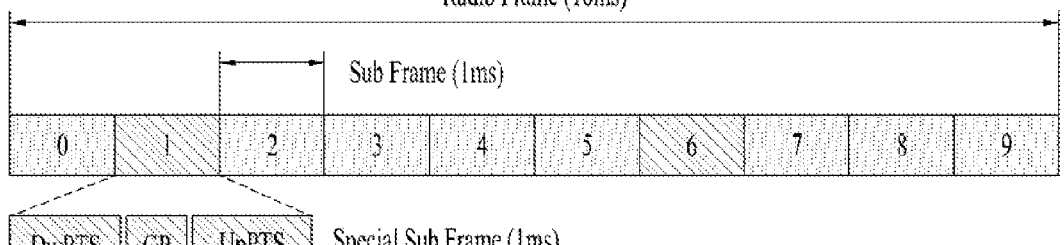
(a)
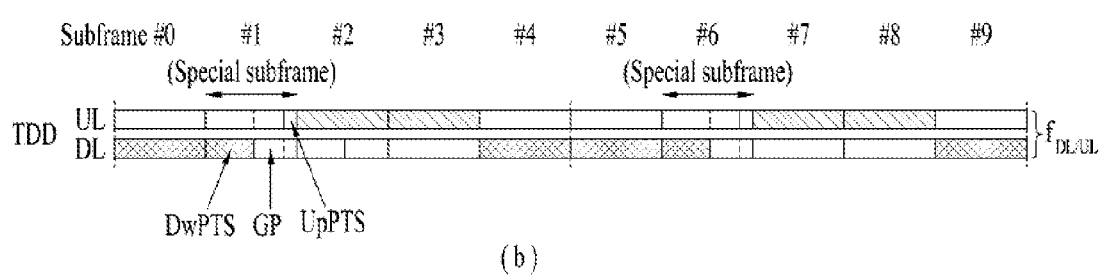
(b)

METHOD AND APPARATUS FOR SIMULTANEOUSLY PERFORMING FREQUENCY RESOURCE SENSING AND DATA TRANSMISSION IN A WIRELESS COMMUNICATION SYSTEM

This application claims the benefit of U.S. Provisional Application No. 61/677,009, filed on Jul. 30, 2012 and 61/749,849, filed on Jan. 7, 2013, which are hereby incorporated by reference as if fully set forth herein.

BACKGROUND OF THE INVENTION

1. Field of the Invention

The present invention relates to a method and apparatus for simultaneously performing frequency resource sensing and data transmission in a wireless communication system.

2. Discussion of the Related Art

Cognitive Radio (CR) was introduced to efficiently use frequency resources in an environment in which available frequency resources have been reduced in view of the rapid development of wireless communication service and already allocated frequency resources have been used less frequently. With the CR technology, a wireless device autonomously detects and uses unused frequency resources, thus conducting efficient communication without frequency resource waste.

A Secondary User (SU) can search for frequency resources unused by a Primary User (PU) through spectrum sensing and thus efficiently use the detected frequency resources. In the CR-spectrum sensing environment, the SU should be able to determine the presence or absence of a signal from a PU transmitter with a target detection probability $P_d$ set by a PU system. If the SU determines the presence of a signal from the PU transmitter in a specific frequency band, the SU does not use the frequency band. On the other hand, if the SU determines the absence of a signal from the PU transmitter end in a specific frequency band, the SU may use the frequency band. In this CR-spectrum sensing environment, a surrounding environment may be sensed largely by quiet sensing or active sensing.

Quiet sensing is a spectrum sensing technique in which an SU first determines whether a PU is using a channel of a specific frequency band, before transmission and then only when the channel is empty, the SU transmits data in the specific frequency band. The transmitter of the SU performs quiet sensing according to a frame structure illustrated in FIG. 1. If one transmission frame includes N subframes, the SU transmitter senses whether an intended frequency band is available prior to data transmission by quiet sensing. Specifically, the SU transmitter senses a PU signal during a time period corresponding to $N_q$ subframes, to thereby determine the presence or absence of the PU signal. A PU detection probability is calculated by the following equation using an energy detector.

$$P_d(N_q, M) = Q\left[\frac{\eta - MN_q(SNR_P + 1)}{\sqrt{N_q \sum_{i=1}^{M}(SNR_P\lambda_i + 1)^2 + SNR_P\sqrt{MN_q}}}\right] \quad \text{[Equation 1]}$$

In [Equation 1], Q( ) is a q-function, M is the number of antennas, $SNR_P$ is the Signal-to-Noise Ratio (SNR) of a signal received from a PU transmitter and measured at the SU transmitter, $\eta$ is a threshold level needed to determine the presence or absence of a PU to satisfy a target detection probability $\bar{P}_D$ at the energy detector, expressed as $$\eta = Q^{-1}(\bar{P}_D)\sqrt{N_q \sum_{i=1}^{M}(SNR_P\lambda_i + 1)^2} + MN_q(SNR_P + 1),$$

and $\lambda_i$ is an $i^{th}$ eigenvalue of a channel between the PU transmitter and the SU transmitter. That is, the number of samples $N_q$ for sensing is determined according to the target detection probability $P_d$ and the surrounding environment represented by the SNR $SNR_P$. If the SU transmitter determines that the frequency band is available, the SU transmitter transmits data during the remaining time (i.e. $N-N_q$ subframes). That is, when a false alarm is not generated with the target detection probability satisfied, the SU transmitter transmits data.

A normalized throughput of quiet sensing, $T_{M,Q}$ is given by $$T_{M,Q} = \{1 - P_{f,q}(M, N_q)\}\left(1 - \frac{N_q}{N}\right) \quad \text{[Equation 2]}$$

$$\log_2 \det\left|I_{M_R} + \frac{SNR_S}{M}R_t^{1/2}HR_rH^HR_t^{H/2}\right|$$

$$P_{f,q}(M, N_q) = \quad \text{[Equation 3]}$$

$$Q\left[Q^{-1}(\bar{P}_d)\sqrt{1/M \sum_{i=1}^{M}(SNR_P\lambda_i + 1)^2} + SNR_P\sqrt{MN_q}\right]$$

where $P_{f,q}(M,N_q)$ is a false alarm probability, $1-P_{f,q}(M,N_q)$ is a non-false alarm probability, that is, a transmittable probability, and $(N-N_q)/N$ is a ratio of a data transmittable time period. $I_{M_R}$ is an MR×MR unit matrix, H is an $N_r \times N_t$ channel matrix, and $R_t$ and $R_r$ are $N_t \times N_t$ and $N_r \times N_r$ antenna correlation matrices, respectively. det( ) is the determinant of a matrix.

Active sensing is a technique in which time resources are not divided for sensing and a transmitting SU terminal continues data transmission, performing PU sensing with the aid of an inactive terminal (i.e. a terminal that is not transmitting or receiving data) within the same network. FIG. 2 illustrates a system model and frame structure for active sensing. Referring to FIG. 2, compared to quiet sensing, the inactive SU performs PU sensing during all N subframes and the transmitting SU transmits data also in all of the N subframes. Active sensing is characterized in that a transmission entity and a sensing entity are different. A normalized throughput of active sensing, $T_{M,A}$ is given by $$T_{M,A} = \quad \text{[Equation 4]}$$

$$\{1 - P_{f,a}(M, N)\}\log_2 \det\left|I_{M_R} + \frac{SNR_S}{M}R_t^{1/2}HR_rH^HR_t^{H/2}\right|$$

$$P_{f,a}(M, N) = \quad \text{[Equation 5]}$$

$$Q\left[Q^{-1}(\bar{P}_d)\sqrt{1/M \sum_{i=1}^{M}(SNR_P/(SNR_s + 1)\lambda_i + 1)^2} + SNR_P/(SNR_s + 1)\sqrt{MN}\right]$$

Herein, $SNR_s$ is the SNR of a signal received from the transmitting SU and measured at the inactive SU. Compared to quiet sensing, active sensing offers the benefit of no time loss for data transmission because data is transmitted in all N subframe. From the perspective of false alarm performance, it may be said that interference from a signal transmitted by the transmitting SU is a loss and the increase of sensing samples from $N_q$ to N is a gain.

It is important to determine the lowest limit of the SNR $SNR_P$ at which a PU signal is supposed to be detected in the above-described CR-spectrum sensing environment. In this regard, a Federal Communications Commission (FCC) document says that a sensing-based device should be able to detect a Digital TV (DTV) signal of −114 dBm and a low-power auxiliary signal of −107 dBm. Given an average TV-band noise power of −98 dBm, an SU should be able to sense at least a DTV signal with an $SNR_P$ value of −16 dB or above and at least a low-power auxiliary signal with an $SNR_P$ value of −9 dB or above.

Bi-directional communication means that one node performs both transmission and reception. If there are a pair of nodes that want to transmit and receive signals, the nodes can exchange signals at the same time without a transmission and reception delay by bi-directional communication. Conventionally, simultaneous transmission and reception in one node is not easy due to hardware limitations. When a node receives a signal from the other party simultaneously with signal transmission, the transmitted signal of the node serves as self-interference to the node. However, the past few years has witnessed suggestion and implementation of self-interference cancellation techniques in terms of hardware and software. The self-interference cancellation techniques have been actively studied, which use a precoder, beamforming, a reception filter, etc. based on transmission signal information and channel information about a transmitter itself. A device that can perfectly eliminate an echo signal whose strength is different from those of a transmission signal and a reception signal by 70 dB to 90 dB can be achieved in hardware based on isolation in order to conduct bi-directional communication.

In the case where an energy detector is used, if the surrounding environment changes and as a result, an actual value of $SNR_P$ is different from a known value of $SNR_P$, the sensing performance of the energy detector that detects the presence or absence of a PU signal is degraded. In this context, blind sensing algorithms have been proposed, which perform sensing using multiple antennas without oversampling a received signal or using the SNR of a received signal, $SNR_P$. In these algorithms, statistical signal characteristics are calculated using linear prediction, QR decomposition, and oversampling of a received signal, with respect to the presence of a PU signal and the absence of a PU signal. Because an oversampled signal having a signal and noise mixed in it has a high correlation, relative to an oversampled signal including noise only, the capability of detecting a PU signal even at a low $SNR_P$ can be increased significantly by the use of a correlation-based detection ratio.

However, in the case of quiet sensing, a sensing period ($N_q$ subframes) is needed for accurate sensing. The resulting decrease of a transmission period ($N-N_q$ subframes) leads to a lower throughput.

Active sensing faces the following problems. First of all, since active sensing needs the aid of another inactive SU, sensing power is additionally consumed. Due to the need for feedback of sensing information, power for transmission and radio channel resources for feedback are additionally used. In addition, a transmission entity and a sensing entity are located at different positions. Consequently, feedback is delayed and it is difficult to ensure the accuracy of sensing information. Finally, although the reliability of a link on which a sensing result is transmitted increases with the link quality between the transmitting SU and the inactive SU, a signal transmitted from the transmitting SU serves as interference, thus decreasing the accuracy of sensing information. On the other hand, as the link quality gets poorer, less interference is caused and thus sensing information is more accurate. However, the reliability of the feedback link is decreased.

To solve the foregoing problems, the transmission entity and the sensing identity should be identical and a method of dividing resources other than time resources is needed to allow simultaneous transmission and sensing.

A heterogeneous network refers to a communication network in which homogeneous or heterogeneous systems are deployed in the same area and thus operate with mutual influences. Examples of such a heterogeneous network include a Hierarchical Cell Structure (HCS), a femtocell, a smart grid network, etc.

For active transmission in the above-described environment, co-existence management of neighboring networks is essential. Sharing limited frequency resources between systems causes problems. The channel quality of an intended system to be used as well as the channel quality of an existing system is degraded. To avert this problem, it is necessary to move to another channel if it is determined by sensing the states of neighbor channels that the quality of a current channel gets poor or to select another channel if an intended channel has a poor quality.

A PU and a plurality of SUs co-exist in a CR-heterogeneous network environment. To sense a surrounding situation and select a channel to be used for the purpose of co-existence between SUs in time resources, a centralized control scheme and a decentralized control scheme are largely available.

According to the centralized control scheme, co-existence between SUs is managed through a central controller or a DataBase (DB). Specifically, after the DB or the controller collects all information including information about the position or channel use or non-use of each user, it records channel use information about each SU or allocates a requested channel to an SU.

Each SU acquires information about channels available at its location from a DB of a PU or sensing information about a PU signal in the centralized control scheme. Subsequently, the SU determines whether an intended channel is being used by another SU. If the channel is empty, the SU uses the channel and updates information about the channel in an SU database. On the contrary, if the intended channel is being used by another SU, the SU determines whether any other channel is available. If all channels available to the SU at its current location are occupied by other SUs, the SU waits or selects a channel that causes least interference currently, uses the selected channel, and registers the channel in the SU DB.

According to the decentralized control scheme, individual nodes share frequency resources, cooperating with one another in an interference avoidance mechanism, rather than a specific controller decides for each node whether the node is supposed to use a channel. Each SU is synchronized with other SUs and determines whether the other SUs are using channels or interfering by transmitting a beacon signal in time synchronization. Since a specific controller does not decide whether the SU is to use a channel, the individual SU decides whether to use a channel according to its own judgment under a condition set by the network.

In the decentralized control scheme, each user acquires information about channels available at its location from a PU DB or by sensing a PU signal and then monitors a beacon signal during a co-existence window period. In the absence of a beacon signal on an intended channel to be used, which means that no neighboring SU is using the channel, the SU determines to use the channel and transmits a beacon signal during the next co-existence window period. On the contrary, in the presence of a beacon signal on the intended channel to be used, the SU checks whether a beacon signal exists on any other channel and then uses a channel free of a beacon signal. If all channels available to the SU at the current location have beacon signals, the SU waits until the next co-existence window or selects a channel that causes least interference at the moment, uses the selected channel, and transmits a beacon signal during the next co-existence window period.

If the length of one frame is M, the length of available time resources is $M_c$, the number of antennas at an SU transmitter is $N_t$, and the number of antennas at a receiver is $N_r$, the average SU throughput $T_c$ of the conventional technique that divides time resources is calculated by [Equation 6].

$$T_c = \max_{i \in A}\left(1 - \frac{M_c}{M}\right)E\left[\log_2 det\left|I_{N_r} + \frac{SNR_s}{N_t}R_t^{1/2}HR_rH^HR_t^{H/2}\right|\right] \quad \text{[Equation 6]}$$

Herein, A is a set of available channels, E( ) is an expectation function representing an average, det(K) is a determinant of matrix K, $I_{N_r}$ is an $N_r \times N_r$ unit matrix, $SNR_s$ is an SNR of a secondary link, H is an $N_r \times N_t$ channel matrix, and $R_t$ and $R_r$ are $N_t \times N_t$ and $N_r \times N_r$ antenna correlation matrices, respectively.

A Macro-cell Base Station (MBS) is overlaid with a plurality of Small-cell Base Stations (SBSs) in a heterogeneous cellular network environment. The size of the MSB is different from the sizes of the SBSs. In the heterogeneous cellular network environment, time resources and frequency resources are allocated in the centralized or decentralized control scheme as in the CR-heterogeneous network environment. An MBS allocates time/frequency resources to each SBS by scheduling them in the centralized control scheme, whereas an individual SBS determines a surrounding situation on its own and uses a frequency based on the determination in the decentralized control scheme.

In the heterogeneous cellular network environment, each SBS measures the interferences of available frequency resources and selects a least interfering channel based on the interference measurements. Once a frequency band (i.e. a channel) is selected, the SBS transmits data on the selected channel until it ends the data transmission. When a data transmission frame ends, the SBS selects a frequency band for the next frame based on interference measurements.

The centralized control scheme requires an additional DB to collect information, thus incurring cost to build and manage the DB. Moreover, a data transmission time is reduced by as much as a time taken to retrieve necessary information from the DB or a time taken to register information in the DB. As a result, a throughput is decreased. In contrast, the decentralized control scheme is relieved of the cost of building and managing an additional DB because there is no need for the additional DB to collect information. However, due to transmission and sensing of a beacon signal during a co-existence window period, a data transmission is decreased by as much as the co-existence window period, thereby decreasing a throughput. Both of the above-described schemes take much time to select a channel. The resulting decrease of a time period assigned to data transmission leads to a lower throughput.

SUMMARY OF THE INVENTION

Accordingly, the present invention is directed to a method and apparatus for simultaneously performing frequency resource sensing and data transmission in a wireless communication system that substantially obviate one or more problems due to limitations and disadvantages of the related art.

An object of the present invention is to provide a method for simultaneously performing frequency resource sensing and data transmission.

Another object of the present invention is to provide a method for partitioning a plurality of antennas into antennas for frequency band sensing and antennas for data transmission and reception in order to simultaneously perform frequency resource sensing and data transmission.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for performing frequency band sensing or data transmission and reception at a pico Base Station (BS) within the coverage of a macro BS in a wireless communication system may include determining the number of ($M_s$) antennas for frequency band sensing and the number of ($M_d$) antennas for data transmission and reception from among a plurality of ($M_{total}$) antennas of the pico BS, determining a duration for the frequency band sensing in a radio frame, and performing frequency band sensing or data transmission and reception according to the determined number of ($M_s$) antennas for the frequency band sensing, the determined number of ($M_d$) antennas for the data transmission and reception, and the determined duration for the frequency band sensing. The number of ($M_s$) antennas for the frequency band sensing and the number of ($M_d$) antennas for the data transmission and reception may be determined based on a data throughput of the pico BS and the duration for the frequency band sensing is determined based on the data throughput of the pico BS. The frequency band sensing and the data transmission and reception may be performed simultaneously.

Preferably, the method may further comprises transmitting and receiving data to and from a User Equipment (UE) using the determined number of ($M_S$) antennas for the frequency band sensing in the determined duration for the frequency band sensing.

Preferably, the method may further comprises transmitting and receiving data to and from a UE using the determined number of ($M_S$) antennas for the frequency band sensing and the determined number of ($M_d$) antennas for the data transmission and reception in a duration other than the determined duration for the frequency band sensing in the radio frame.

Preferably, the method may further comprises calculating a data throughput of the pico BS for each of all combinations of an available number of ($M_s$) frequency band sensing and an available number of ($M_d$) data transmission and reception among the plurality of ($M_{total}$) antennas, and selecting a combination having a maximum data.

Preferably, a frequency band having the least interference may be selected based on a result of the frequency band sensing and the frequency band sensing or the data transmission and reception may be performed in the selected frequency band.

Preferably, if the frequency band sensing is performed on a downlink, a downlink signal transmitted from the pico BS to a UE may be eliminated from a downlink signal received in the antennas for the frequency band sensing, and if the frequency band sensing is performed on an uplink, an uplink signal transmitted from the UE to the pico BS may be eliminated from an uplink signal received in the antennas for the frequency band sensing.

In another aspect of the present invention, a pico BS for performing frequency band sensing or data transmission and reception within the coverage of a macro BS in a wireless communication system includes a Radio Frequency (RF) unit and a processor configured to control the RF unit. The processor may be configured to determine the number of ($M_s$) antennas for frequency band sensing and the number of ($M_d$) antennas for data transmission and reception from among a plurality of ($M_{total}$) antennas of the pico BS, determine a duration for the frequency band sensing in a radio frame, and perform frequency band sensing or data transmission and reception according to the determined number of ($M_s$) antennas for frequency band sensing, the determined number of ($M_d$) antennas for data transmission and reception, and the determined duration for the frequency band sensing. The number of ($M_s$) antennas for the frequency band sensing and the number of ($M_d$) antennas for the data transmission may be determined based on a data throughput of the pico BS and the duration for the frequency band sensing may be determined based on the data throughput of the pico BS. The frequency band sensing and the data transmission and reception may be performed simultaneously.

Preferably, the processor may be configured to transmit and receive data to and from a UE using the determined number of ($M_S$) antennas for the frequency band sensing in the determined duration for the frequency band sensing.

Preferably, the processor may be configured to transmit and receive data to and from a UE through the determined number of ($M_S$) antennas for the frequency band sensing and the determined number of ($M_d$) antennas for the data transmission and reception in a duration other than the determined duration for the frequency band sensing in the radio frame.

Preferably, the processor may be configured to calculate a data throughput of the pico BS for each of all combinations of an available number of ($M_s$) antennas for the frequency band sensing and an available number of ($M_d$) antennas for the data transmission and reception among the plurality of ($M_{total}$) antennas, and select a combination having a maximum data throughput.

Preferably, the processor may be configured to select a frequency band having the least interference based on a result of the frequency band sensing and perform frequency band sensing or data transmission and reception in the selected frequency band.

Preferably, if the frequency band sensing is performed on a downlink, the processor may configured to eliminate a downlink signal transmitted from the pico BS to a UE from a downlink signal received in the antennas for the frequency band sensing, and if the frequency band sensing is performed on an uplink, the processor may be configured to eliminate an uplink signal transmitted from the UE to the pico BS from an uplink signal received in the antennas for the frequency band sensing.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 12 illustrates antenna partitioning and an operation based on the antenna partitioning in a heterogeneous cellular network environment;

FIG. 13 illustrates operations based on antenna partitionings in a heterogeneous cellular network environment;

FIG. 16 illustrates a Time Division Duplexing (TDD) radio frame structure in a Long Term Evolution/Long Term Evolution-Advanced (LTE/LTE-A) system;

DETAILED DESCRIPTION OF THE INVENTION

Figure 1:
FIG. 1 illustrates an exemplary radio frame structure for quiet sensing in a wireless communication system.
Figure 2:
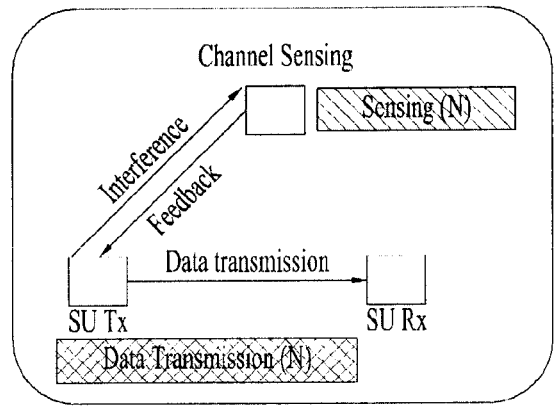
FIG. 2 illustrates an exemplary system model and frame structure for active sensing in a wireless communication system.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

Techniques, devices, and systems as set forth below are applicable to various wireless multiple access systems. For clarity, this application focuses on a $3^{rd}$ Generation Partnership Project Long Term Evolution (3GPP LTE) or LTE-Advanced (LTE-A) system. However, the technical features of the present invention are not limited thereto. For example, even though the following description is given in the context of the 3GPP LTE or LTE-A system as a mobile communication system, the same thing applies to other mobile communication systems, except for features inherent to 3GPP LTE or LTE-A.

In some instances, known structures and devices are omitted or are shown in block diagram form, focusing on important features of the structures and devices, so as not to obscure the concept of the invention. The same reference numbers will be used throughout this specification to refer to the same parts.

In the present invention, a User Equipment (UE) is fixed or mobile. The UE is a device that transmits and receives user data and/or control information by communicating with a Base Station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB or eNode B)', 'Base Transceiver System (BTS)', 'Access Point (AP)', 'Processing Server (PS)', 'point', 'Transmission Point (TP)', 'Reception Point (RP)', 'Down-Link (DL) point', 'UpLink (UL) point', 'cell', etc.

In the present invention, a Physical Downlink Control CHannel (PDCCH), a Physical Control Format Indicator CHannel (PCFICH), a Physical Hybrid automatic repeat request Indicator CHannel (PHICH), and a Physical Downlink Shared CHannel (PDSCH) is sets of time-frequency resources or sets of Resource Elements (REs) that carry Downlink Control Information (DCI), a Control Format Indicator (CFI), DL ACKnowledgement/Negative ACK (ACK/NACK), and DL data, respectively. A Physical Uplink Control CHannel (PUCCH) and a Physical Uplink Shared CHannel (PUSCH) are sets of time-frequency resources or sets of REs that carry Uplink Control Information (UCI) and UL data, respectively. Particularly, time-frequency resources or REs allocated or belonging to the PDCCH, PCFICH, PHICH, PDSCH, PUCCH, and PUSCH are referred to as PDCCH, PCFICH, PHICH, PDSCH, PUCCH, and PUSCH REs or PDCCH, PCFICH, PHICH, PDSCH, PUCCH, and PUSCH resources, respectively in the present invention. Accordingly, PUCCH or PUSCH transmission of a UE amounts to transmission of UL control information, UL data, or a random access signal on the PUSCH or the PUCCH from the UE in the present invention. In addition, transmission of the PDCCH, PCFICH, PHICH, or PDSCH from a BS amounts to transmission of DL data or DL control information on the PDCCH, PCFICH, PHICH, or PDSCH from the BS.

In the present invention, Cell-specific Reference Signal (CRS), Demodulation Reference Signal (DMRS), and Channel State Information Reference Signal (CSI-RS) time-frequency resources (or REs) refer to REs that can be allocated or that are available to a CRS, DMRS, and CSI-RS, respectively or time-frequency resources (or REs) that carry the CRS, DMRS, and CSI-RS, respectively. Subcarriers having the CRS REs, DMRS REs, and CSI-RS REs are referred to as CRS, DMRS, and CSI-RS subcarriers, respectively, and Orthogonal Frequency Division Multiplexing (OFDM) symbols having the CRS REs, DMRS REs, and CSI-RS REs are referred to as CRS, DMRS, and CSI-RS symbols, respectively. In the present invention, SRS time-frequency resources (or REs) refer to time-frequency resources (or REs) carrying a Sounding Reference Signal (SRS) that is transmitted from a UE to a BS, for use in measuring the state of a UL channel established between the UE and the BS. A Reference Signal (RS) is a predefined signal having a special waveform known to both a UE and a BS. The RS is also called a pilot signal.

A cell refers to a predetermined geographical area to which a BS, a node(s), or an antenna port(s) provides a communication service in the present invention. Thus, communication with a specific cell may mean communication with a BS, a node, or an antenna port that provides a communication service to the specific cell in the present invention. A DL or UL signal of the specific cell is a DL or UL signal from or to the BS, the node, or the antenna port that provides a communication service to the specific cell. A channel state or quality of the specific cell refers to the channel state or quality of a channel or communication link established between a UE and the BS, the node, or the antenna port that provides a communication service to the specific cell.

Figure 3:
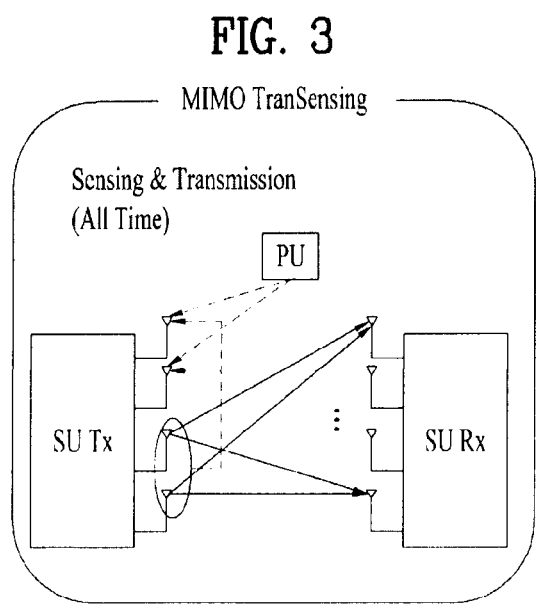
FIG. 3 illustrates a configuration of a TranSensing system according to an embodiment of the present invention.

To solve problems encountered with conventional technologies, the present invention provides a configuration of adapting the concept of bi-directional communication to simultaneous surrounding environment sensing and data transmission. Compared to quiet sensing that divides time resources, simultaneous sensing and transmission called 'TranSensing' is a scheme of partitioning antennas by antenna isolation and self-interference cancellation in a multi-antenna environment. A TranSensing system has a configuration illustrated in FIG. 3.

If an SU transmitter basically has M antennas, an environment is assumed, in which the M antennas are partitioned into $M_s$ antennas for sensing based on antenna isolation and self-interference cancellation and $M_d$ antennas for data transmission. TranSensing is different from quiet sensing in terms of a sensing period, the number of sensing antennas, a data transmission period, and the number of data transmission antennas, as follows. First, N subframes (i.e. all time) may be used for sensing in TranSensing, while $N_q$ subframes are used for sensing in quiet sensing. This does not simply mean the increase of a sensing period. Rather, since sensing continues during data transmission, a case in which a PU uses a frequency band during the data transmission may be handled according to a change in a sensing policy, compared to quiet sensing. Second, the data transmission period increases from $N-N_q$ subframes to N subframes in TranSensing. Third, the number of sensing antennas decreases from M to $M_s$ and the number of data transmission antennas decreases from M to $M_d$ in TranSensing. That is, TranSensing is a technique of dividing spatial resources for spectrum sensing, instead of dividing time resources. A normalized throughput $T_{M,T}$ of the proposed Multiple Input Multiple Output (MIMO) TranSensing scheme is determined by $$T_{M,T} = \{1 - P_{f,t}(M_s, N)\}\log_2 det\left|I_{M_R} + \frac{SNR_S}{M_d}\bar{R}_t^{1/2}\bar{H}R_r\bar{H}^H\bar{R}_t^{H/2}\right| \quad \text{[Equation 7]}$$

$$P_{f,t}(M_s, N) = Q\left[Q^{-1}(\bar{P}_d)\sqrt{1/M_s\sum_{i=1}^{M_s}(SNR_p\lambda_i + 1)^2} + SNR_p\sqrt{M_s N}\right] \quad \text{[Equation 8]}$$

$M_s$ is the number of sensing antennas, $M_d$ is the number of data transmission antennas, $\bar{H}$ is an $M \times M_d$ channel matrix between an SU transmitter and an SU receiver, and $\bar{R}_t$ and $R_r$ are $M_d \times M_d$ and $M \times M$ antenna correlation matrices, respectively.

Antenna partitioning is crucial to implementation of TranSensing in the multi-antenna environment. If two antennas are given, there is no other choice but to use one antenna for sensing and the other antenna for data transmission by antenna partitioning. However, if the number M of antennas increases, the number of possible cases of antenna partitioning also increases. At this point, how to partition antennas is important in TranSensing.

Figure 4:
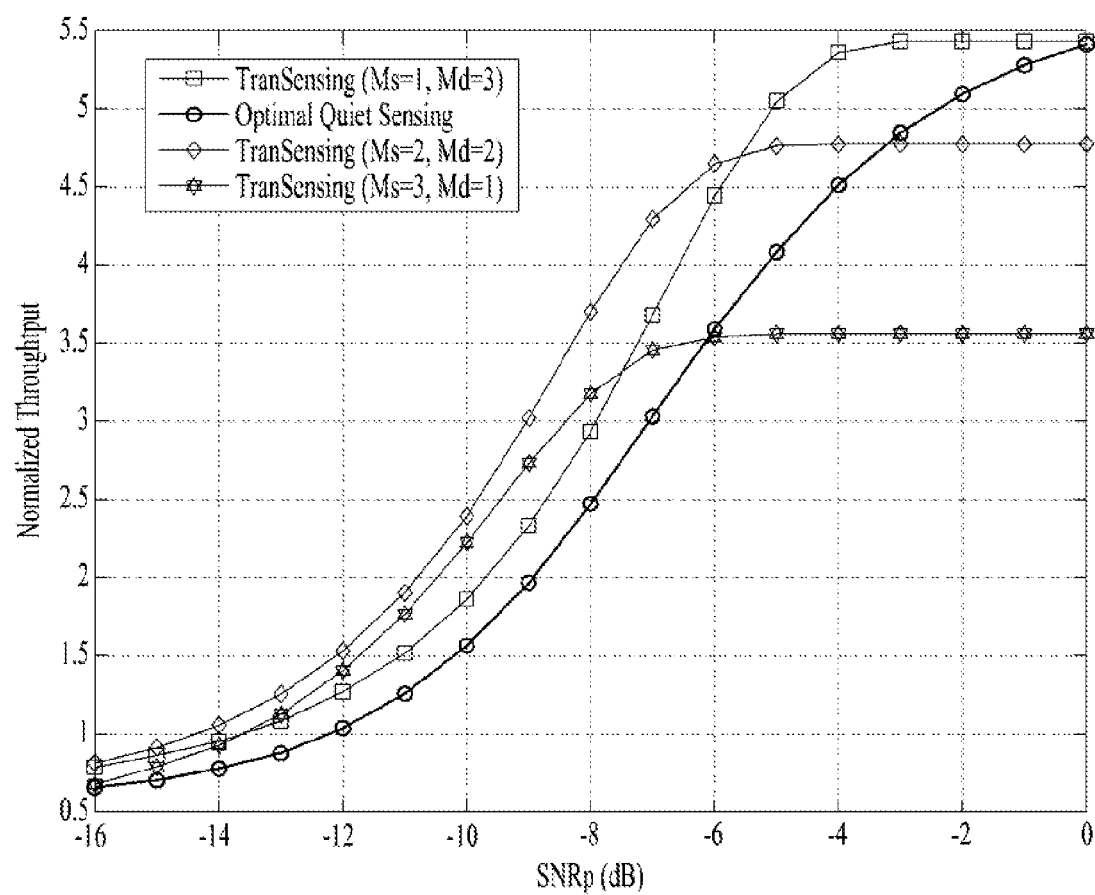
FIG. 4 is a graph illustrating throughputs achieved by antenna partitioning in a TranSensing system.

FIG. 4 is a graph illustrating normalized throughputs with respect to SNRs of a primary link, $SNR_P$ changing from −16 dB to 0 dB under the condition that the number of antennas is 4 (M=4), the SNR of a secondary link is 5 dB ($SNR_S$=5 dB), and a target detection probability is 0.9 in order to find out the tendencies of TranSensing antenna partitioning sets. Red squares represent TranSensing and blue circles represent quiet sensing for comparison. A comparison between TranSensing and quiet sensing reveals that there is antenna partitioning suitable for an environment, that is, a set of the number of sensing antennas and the number of data sensing antennas, which is suitable for an environment. If the SNR of a PU is low, (<−6 dB), allocation of two antennas for sensing and the other two antennas for data transmission out of four antennas leads to the best performance. If three antennas are allocated for sensing, sensing performance may be good. However, the normalized throughput is lower than in the case of two sensing antennas and two data transmission antennas, due to a smaller number of data transmission antennas. On the other hand, if the SNR of the PU is larger than −6 dB, allocation of one sensing antenna and three data transmission antennas leads to the best performance. That is, it is better to allocate more antennas for sensing when satisfying a sensing requirement is difficult and to allocate more antennas for data transmission when satisfying a sensing requirement is easy.

Figure 5:
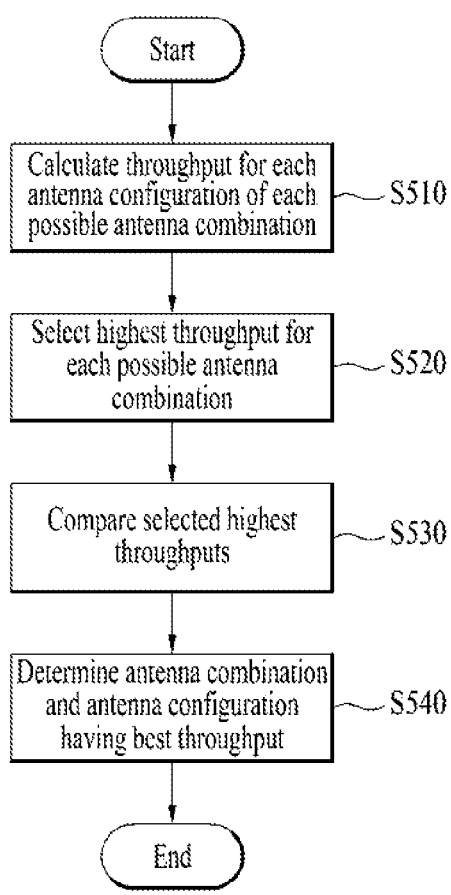
FIG. 5 is a flowchart illustrating a Full Search Antenna Partitioning (FSAP) scheme.

Accordingly, antennas need to be partitioned adaptively according to a surrounding environment in order to properly implement TranSensing. FIG. 5 is a flowchart illustrating a Full Search Antenna Partitioning (FSAP) scheme that exhaustively considers all possible antenna partitioning sets to determine an antenna partitioning set maximizing a normalized throughput according to each instantaneous channel environment ($SNR_P$, $\bar{H}$). An overall FSAP operation is given as

---

❖ Full Search Antenna Partitioning (FSAP)

▓ Initialization T=0
▓ For $M_s$ = 1:$M_T$ − 1
　▓ All Possible Set K = $_{M_T}C_{M_s}$, given $M_s$
　▓ Initialization:
　　▓ D = $0_1$ $m_{opt}$ = 0
　▓ For m = 1:K
　　▓ Compute $T_{M_s,T}(m)$
　　▓ If $T_{M_s,T}(M) \geq$ D Then
　　　▓ $m_{opt}$ = m, D = $T_{M_s,T}(m)$
　▓ End loop
　▓ Output $m_{opt}$, D
▓ If D ≥ T, Then # $M_{s,opt}$ = $M_s$, T = $T_{M_s,T}(m_{opt})$
▓ End loop
▓ Output # $M_{s,opt}$, $m_{opt}$

---

More specifically, a throughput is calculated for every possible set K with the number of sensing antennas $M_S$ selectable from the total number of antennas $M_T$, $M_S$ changing from 1 to $M_T$−1. Then the maximum D of the calculated throughputs is achieved and an antenna partitioning set $m_{opt}$ corresponding to the maximum throughput D is determined. If the maximum throughput D is equal to or larger than a maximum throughput T calculated for a previous antenna partitioning set or another antenna partitioning set with a different number of sensing antennas, the number $M_S$ of sensing antennas corresponding to the maximum throughput D is determined to be an optimum number of sensing antennas, $\#M_{S,opt}$ and the corresponding antenna partitioning set $m_{opt}$ is selected as an optimum antenna partitioning set.

The FSAP scheme is ideal in terms of performance because an optimum antenna partitioning set is selected by comparing all possible antenna partitioning sets according to all channel states. However, due to selection of an optimum antenna partitioning each time the instantaneous value of a surrounding environment is changed, complexity increases continuously by $$\sum_{i=1}^{M_T-1} {}_{M_T}C_i$$

each time, according to a channel change.

Figure 6:
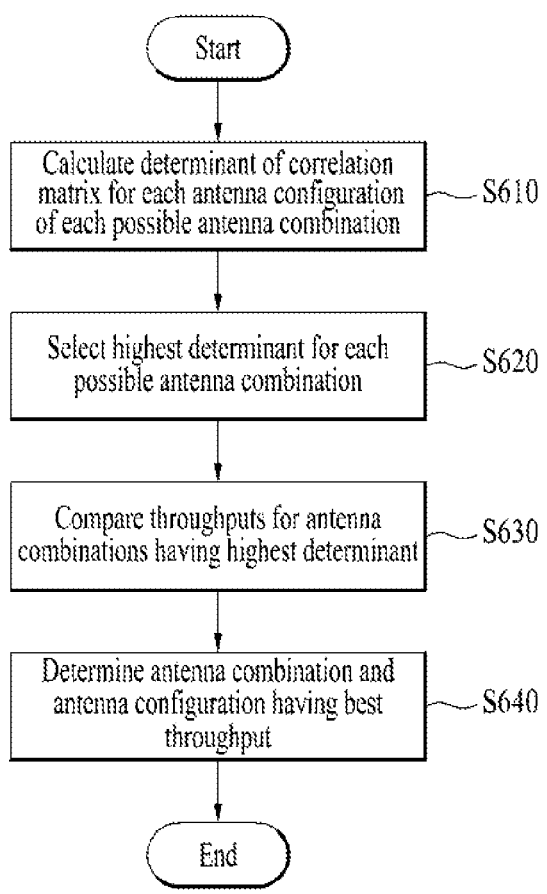
FIG. 6 is a flowchart illustrating a Correlation-based Antenna Partitioning (CAP) scheme.

Optimization computation for each instantaneous channel situation increases complexity significantly and causes problems in real implementation. If the position of a node is fixed in a real communication environment, the statistical characteristics of the surrounding environment do not change much. Accordingly, Correlation-based Antenna Partitioning (CAP) is proposed, in which all possible antenna partitioning cases are compared based on the statistical characteristics of a surrounding environment and antenna correlations. FIG. 6 illustrates a flowchart illustrating an overall CAP operation. The CAP operation may be expressed as

---

❖ Correlation-based Antenna Partitioning (CAP)

▓ Initialization T=0
▓ For $M_s$ = 1:$M_T$ − 1
　▓ All Possible Set K = $_{M_T}C_{M_s}$, given $M_s$
　▓ Initialization:
　　▓ D = $0_1$ $m_{opt}$ = 0
　▓ For m = 1:K
　　▓ Compute det($R_m$)
　　▓ If det($R_m$) ≥ D Then
　　　▓ $m_{opt}$ = m, D = det($R_m$)
　▓ End loop
　▓ Output $m_{opt}$
▓ Compute $T_{M_s,T}(m_{opt})$
▓ If $T_{M_s,T}(m_{opt}) \geq$ T, Then # $M_{s,opt}$ = $M_s$, T = $T_{M_s,T}(m_{opt})$
▓ End loop
▓ Output # $M_{s,opt}$, $m_{opt}$

---

CAP is divided largely into two parts: (1) how many data transmission antennas and how many sensing antennas are total antennas to be partitioned into? (2) What antennas are to be allocated within the predetermined numbers of antennas? If the total number of antennas is $M_T$, complexity is $$\sum_{i=1}^{M_T-1} {}_{M_T}C_i.$$

Compared to FSAP, as long as the statistical characteristics of channels are not changed, once an antenna partitioning set is selected, the selected antenna partitioning set is not changed in CAP.

Figure 7:
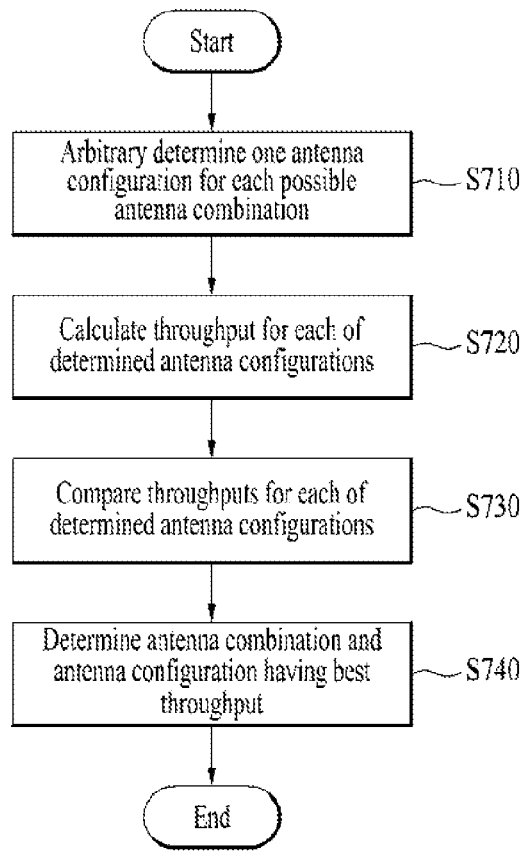
FIG. 7 is a flowchart illustrating a Simple Antenna Partitioning (SAP) scheme.

In CAP, as the total number of antennas increases, the complexity also increases significantly. In addition, the complexity of CAP is not reduced much, relative to the complexity of FSAP, in an environment where each node is mobile and thus the statistical characteristics of channels change often. To avert this problem, therefore, Simple Antenna Partitioning (SAP) is proposed, as illustrated in FIG. 7. SAP is implemented as follows.

---
❖ Simple Antenna Partitioning (SAP)
---
※ Initialization:
  ※ T = 0, # $M_{s,opt}$ = 0
※ For $M_s$ = 1:$M_T$ − 1
  ※ Compute $T_{M_s,T}(1)$
  ※ If $T_{M_s,T}(1) \geq$ T, Then # $M_{s,opt}$ = $M_s$, T = $T_{M_s,T}(1)$
※ End loop
※ Output # $M_{s,opt}$
---

Figure 8:
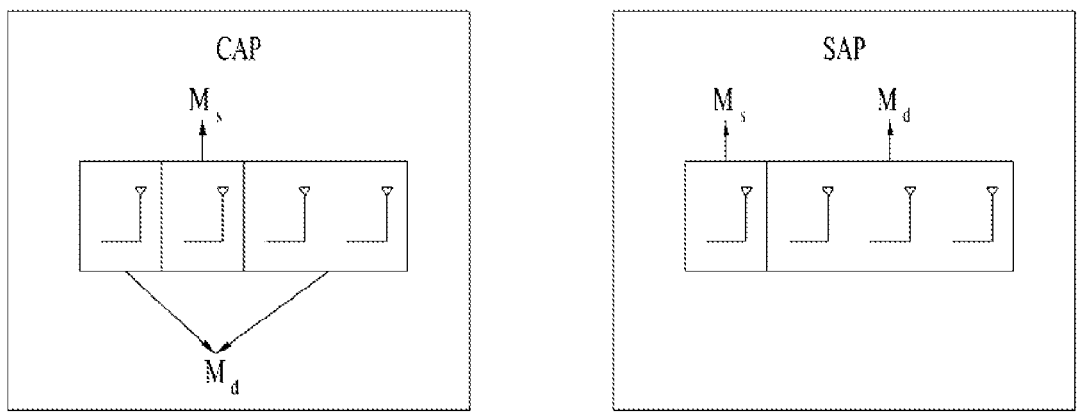
FIG. 8 illustrates an exemplary CAP-based antenna partitioning and an exemplary SAP-based antenna partitioning.

In SAP, only the number of data transmission antennas and the number of sensing antennas are determined and antennas are partitioned in a predetermined method (e.g., an Identifier (ID) is assigned to each of the antennas and $M_s$ antennas are allocated for sensing in an ascending order of IDs, while the other $M_d$ antennas are allocated for data transmission). FIG. 8 illustrates an exemplary SAP operation.

An analysis of a case of allocating one sensing antenna by the above antenna partitioning reveals that the throughput is maximized by allocating a minimum number of antennas for sensing and a maximum number of antennas for data transmission in an environment in which a sensing requirement is easily satisfied (e.g. a low sensing requirement environment or a high $SNR_P$ environment). An adaptive antenna allocation scheme may further be contemplated, in which when a sensing requirement is not high for a surrounding environment and thus is easily satisfied, even an antenna allocated for sensing may be used for data transmission. If an SU senses in necessary $N_q$ subframes and transmits data in the remaining $N-N_q$ subframes as in quiet sensing, rather than the SU only senses in the N subframes, the total system throughput may further be increased under circumstances. To determine an optimum sensing period (e.g., in subframes), sensing duration selection is performed as follows.

---
❖ Sensing duration selection
---
※ If # $M_{s,opt}$ = 1
  ※ Initialization: T = 0, $N_{q,opt}$ = 0
※ For $N_q$ = 1:N
  ※ Compute $T_{M,H}(N_q)$
  ※ If $T_{M,H}(N_q) \geq$ T, Then $N_{q,opt}$ = $N_q$, T = $T_{M,H}(N_q)$
※ End loop
※ Output $N_{q,opt}$
---

If $N_q$=N, this means that sensing and transmission are performed together during a total time period. Compared to quiet sensing, $M_s$ sensing antennas and $M_d$ data transmission antennas are used during a sensing period, while data is transmitted through all $M_T$ antennas during a transmission period. In TranSensing using sensing duration selection, the following throughput can be achieved.

Figure 9:
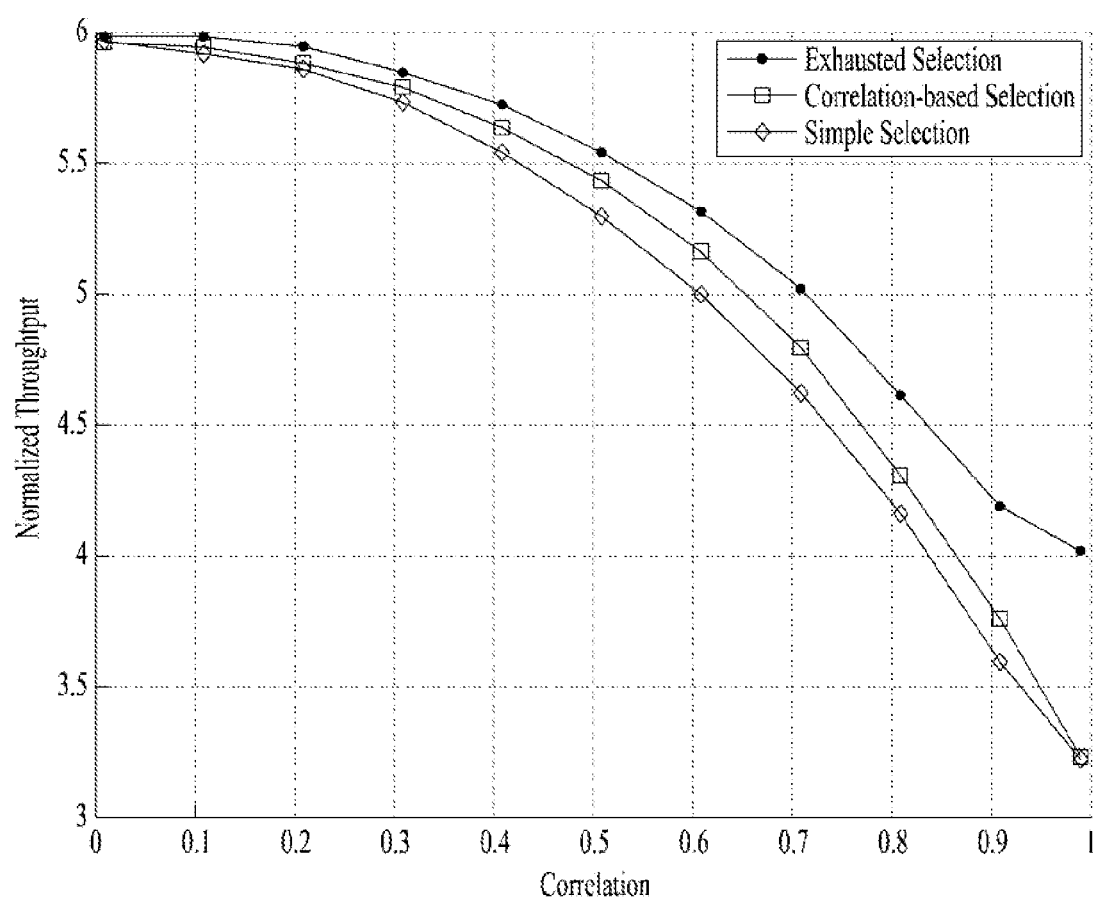
FIG. 9 is a graph comparing throughputs of the FASP, CAP, and SAP schemes.
Figure 10:
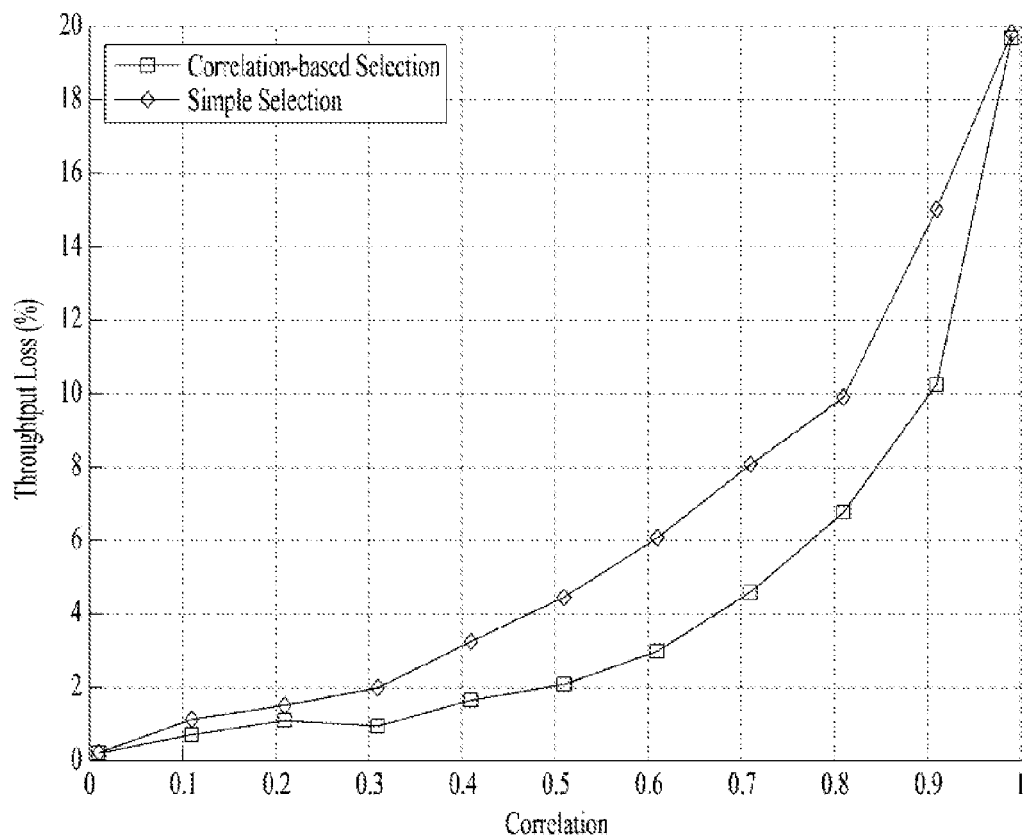
FIG. 10 is a graph illustrating throughput losses of the CAP and SAP schemes with respect to throughputs of the FASP scheme.

FIG. 9 is a graph illustrating normalized throughputs versus antenna correlations under the condition that SNRp=−4 dB, the number of antennas is 4, a target detection probability Pd=0.9, and one frame includes 100 subframes, in order to compare FSAP with the proposed CAP and SAP in terms of performance. Regarding a comprehensive tendency, it is noted that as an antenna correlation increases, the throughput losses of the two schemes are increased relative to FSAP. If the antenna correlation is small (<0.2) or large (>0.9), there is not much throughput difference between CAP and SAP. However, if the antenna correlation is between 0.2 and 0.9, CAP and SAP have different throughputs. More specifically, it is noted from FIG. 10 illustrating the throughput losses of the proposed two schemes relative to FSAP that the throughput loss difference between CAP and SAP ranges from 1% to 5% and, in terms of an absolute loss ratio, the throughput loss difference between CAP and SAP is a double or more.

In summary of the foregoing conventional technologies and embodiment(s) of the present invention, antenna partitioning based on CAP or SAP is preferable in an environment in which the position of a node does not change or in an environment in which statistical environment characteristics are not changed and thus SNRp is known. If an antenna correlation is small (<0.2) or large (>0.9), there is no substantially much performance difference between CAP and SAP and thus SAP is adopted. If the antenna correlation is an intermediate value (between 0.2 and 0.9), antennas are partitioned by CAP. In contrast, in an environment in which the position of a node is changed or statistical environment characteristics are changed, FSAP is used to increase performance and SAP is used to reduce complexity.

If one antenna is allocated for sensing as a result of antenna partitioning optimization, sensing period selection is additionally performed. A sensing period $N_{q,opt}$ maximizing a normalized throughput may be selected in a situation where a given target detection probability is satisfied.

In the case where only the numbers of antennas are to be selected without antenna partitioning optimization, if $SNR_p$ is high or $P_d$ is low, a minimum number of antennas (e.g. one antenna) are allocated for sensing, while the remaining antennas are allocated for data transmission. If $SNR_p$ is low or $P_d$ is high, that is, if a sensing requirement is high, more antennas are allocated for sensing. In addition, in the case of a high antenna correlation, more antennas are allocated for sensing than in the case of a low antenna correlation.

To perform antenna partitioning in an environment where $SNR_p$ is not known in relation to a surrounding situation, a blind sensing technique may be used based on a statistical time ratio at which a PU is occupying a channel. A target detection probability may be satisfied on an average with passage of time by comparing a given sensing result, the target detection probability, and a statistical time ratio and decreasing a detection ratio if a PU is detected more frequently than the statistical time ratio and increasing the detection ratio if the PU is detected less frequently than the statistical time ratio. An increase in the detection ratio in turn increases a false alarm probability in blind sensing, thus affecting total performance. Therefore, if the detection ratio

[Equation 9]

$$T_{M,H} = \frac{N_q}{N}\{1 - P_f(M_{s,opt}, N_q)\}\log_2 det\left|I_{M_R} + \frac{SNR_s}{M_d}\bar{R}_t^{1/2}\bar{H}R_r\bar{H}^H\bar{R}_t^{H/2}\right| +$$

$$\left(1 - \frac{N_q}{N}\right)\{1 - P_f(M_{s,opt}, N_q)\}\log_2 det\left|I_{M_R} + \frac{SNR_s}{M_T}R_t^{1/2}HR_rH^H R_t^{H/2}\right|$$

should be increased much to satisfy a given target detection probability, antenna allocation may be performed by increasing the number of sensing antennas, so as to decrease a performance degradation caused by detection.

Figure 11:
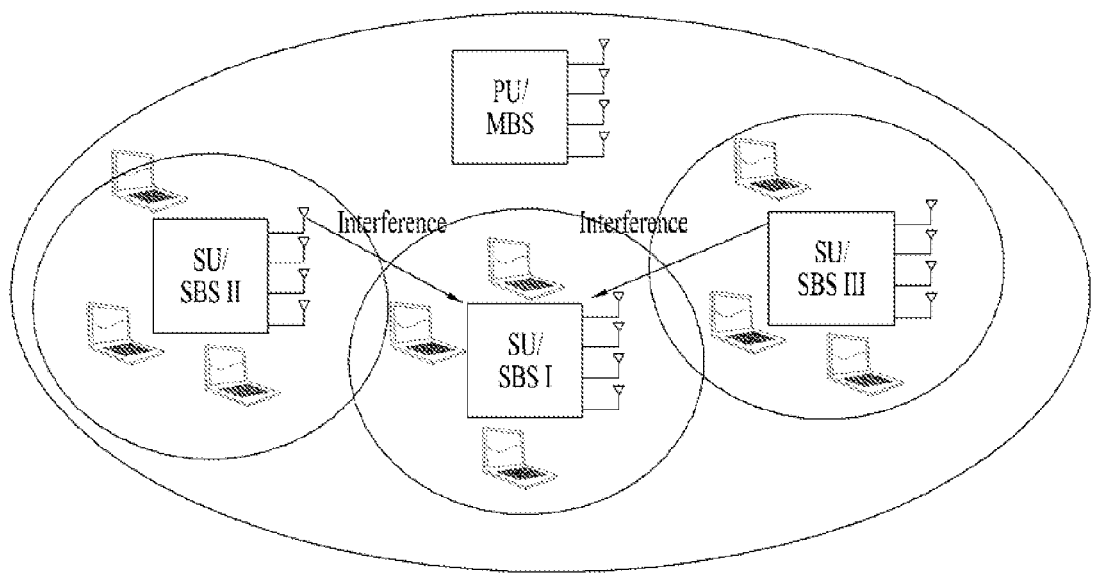
FIG. 11 illustrates a heterogeneous cellular network environment.

Another embodiment of the present invention provides a bi-directional communication system configuration to simultaneously manage coexistence in regard to a surrounding environment during data transmission and reception in the same frequency band, as illustrated in FIGS. 11 and 12.

If an AP or a BS basically has $M_T$ antennas, a wireless communication system illustrated in FIG. 12 may be assumed, in which the $M_T$ antennas may be partitioned into $M_c$ antennas for collecting information about a frequency band such as a data transmission and reception frequency band by antenna isolation and self-interference cancellation and $M_d$ antennas for data transmission.

As illustrated in FIG. 12(b) and FIG. 13, when it is determined based on interference measurements through the $M_c$ coexistence antennas that a channel is available, data transmission starts through the $M_d$ data transmission antennas after the interference measurement period in a first frame. Obviously, data may also be transmitted through the $M_c$ coexistence antennas during a flexible time in FIG. 12(b).

From a second frame on, coexistence information is exchanged through the $M_c$ antennas during data transmission and reception. Particularly when coexistence is managed for a frequency band such as a data transmission and reception band of an internal network, the AP or BS removes its DL signal by self-interference cancellation on DL (i.e. a transmission mode) and removes an internal network signal from signals received through the $M_d$ antennas on UL (i.e. a reception mode), thus managing coexistence.

The proposed scheme will be compared with the conventional scheme in terms of data transmission and reception time, the number of antennas, and operation. After the second frame, the data transmission and reception time increases from $N-N_c$ subframes to N subframes (N is the total number of available subframes and $N_c$ is the number of subframes in which coexistence information is exchanged through the $M_c$ antennas). Although the number of coexistence antennas is decreased from $M_T$ to $M_c$ and the number of data transmission and reception antennas is decreased from $M_T$ to $M_d$, the same spatial resource performance as the conventional scheme may be achieved in the $N-N_c$ subframes. That is, the proposed scheme divides spatial resources, instead of time resources, for data transmission and coexistence management. Particularly, the proposed scheme compensates for a throughput loss caused by a time taken for coexistence management, which is a problem encountered with the conventional scheme that divides time resources. An average SU throughput $T_P$ of the proposed scheme is determined as follows. In the following equation, a channel capacity $C_S$ is achieved when the number of transmission antennas is $M_t$, the number of reception antennas is $N_r$, and a Signal to Interference and Noise Ratio (SINR) is $SINR_S$.

$$T_P = \left(1 - \frac{N_c}{N}\right) \max_{i \in A} C_S(M_t, M_r, SINR_{S_i}) + \frac{N_c}{N} C_S(M_t - M_c, M_r, SINR_{S_i})$$ [Equation 10]

$$C_S(M_t, M_r, SINR_s) = E\left[\log_2 \det\left|I_{M_r} + \frac{SNR_S}{M_t} R_t^{1/2} H R_r H^H R_t^{1/2}\right|\right]$$ [Equation 11]

FIG. 13 will be described in greater detail.

If K channels are available to an SU at its current location based on PU signal measurement or a PU DB, coexistence management is performed for the K channels through $M_c$ antennas in a first frame (FIG. 13(a)). As an example, a channel may be selected based on interference as follows. Each AP or BS determines an interference measurement period. For example, if interference is measured about each antenna through the $M_c$ antennas in $N_c$ subframes, a channel having the least interference is selected based on the interference measurements, and data is transmitted and received through $M_T$ antennas in the remaining $N-N_c$ subframes. Herein, interference may be measured in $N_c$ contiguous subframes or $N_c$ incontiguous subframes divided into smaller units. From a second frame on, data may be transmitted and received through the $M_d$ antennas on a channel selected in the previous frame, simultaneously with coexistence management for the K channels through the $M_c$ antennas. In the data transmission mode (i.e. the DL mode), coexistence management is performed for channels selected in the previous frame by removing a DL signal by antenna isolation and self-interference cancellation and then performing coexistence management through the $M_c$ antennas. In the data reception mode (i.e. the UL mode), after data is received through the $M_d$ antennas and demodulated, a demodulated internal network signal is removed from total signals received through the $M_c$ antennas and then coexistence management is performed.

Figure 14:
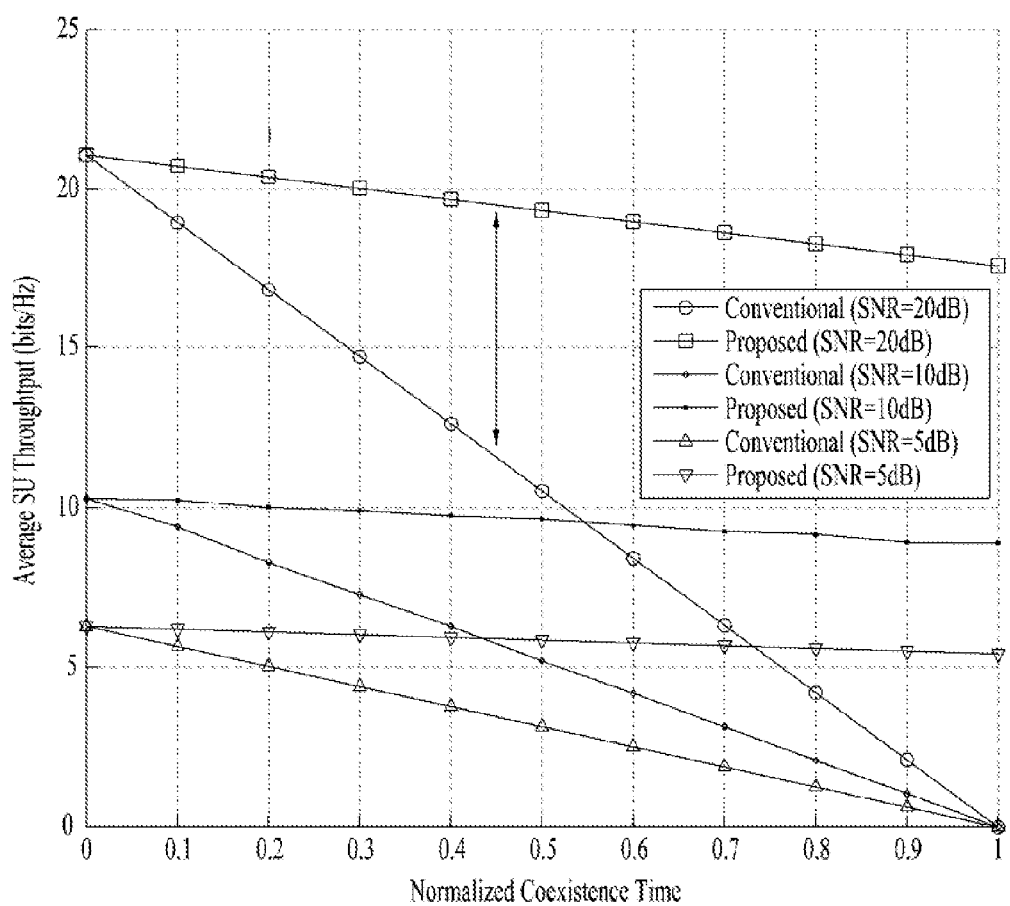
FIG. 14 is a graph comparing throughputs of a conventional technology with throughputs of an embodiment of the present invention.

FIG. 14 is a graph illustrating average SU throughputs versus coexistence time periods under the condition that $SINR_p=5$, 10, and 20 dB, the number of transmission and reception antennas is 4, an antenna correlation coefficient is 0.5, and one frame includes 100 subframes in order to compare the proposed scheme with a scheme that divides time resources in terms of performance. In regard to a comprehensive tendency, as more time is taken for coexistence management, a throughput is decreased with a large inclination in the time resource-division scheme, compared to the proposed scheme. Moreover, as an SINR increases, the performance degradation difference between the proposed scheme and the conventional scheme is widened.

Figure 15:
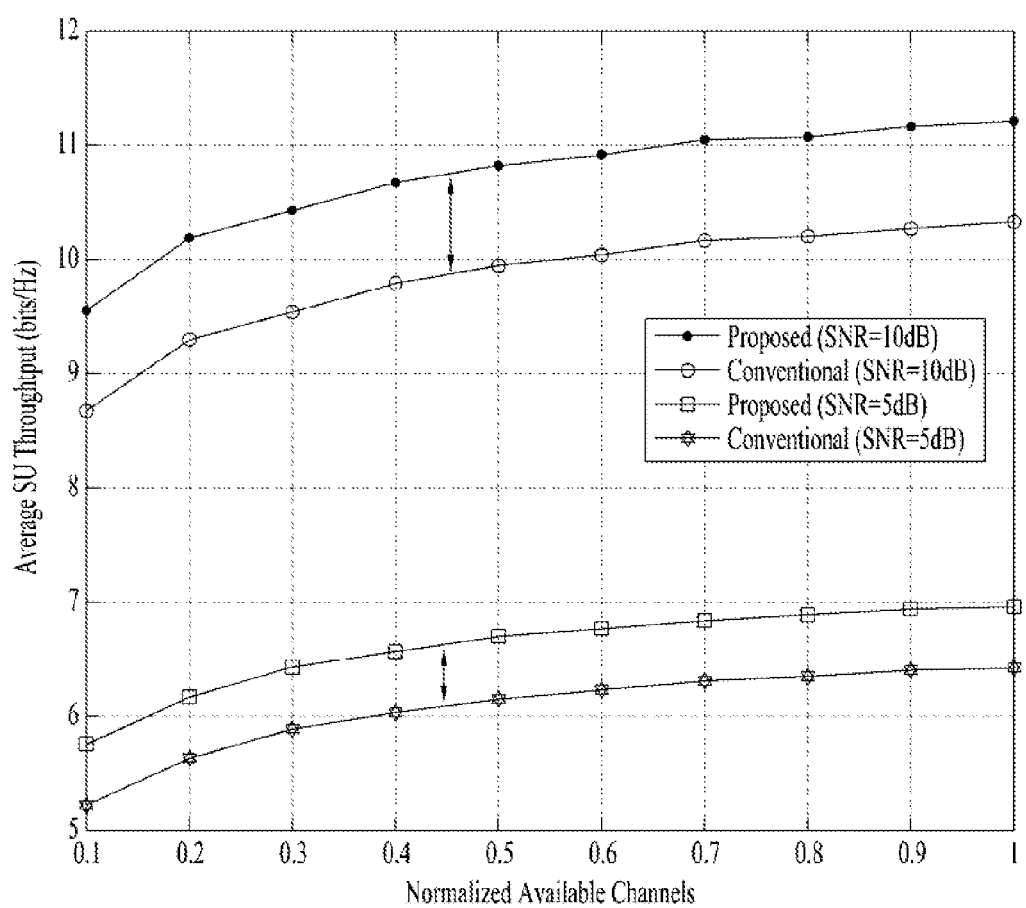
FIG. 15 is a graph comparing throughputs of a conventional technology with throughputs of an embodiment of the present invention.

FIG. 15 is a graph illustrating throughput under the condition that $SINR_s=5$ and 10 dB, the number of transmission and reception antennas is 4, an antenna correlation coefficient is 0.5, one frame includes 100 subframes, and coexistence management is performed in 5 subframes ($N_c=5$) in order to compare a proposed scheme with a scheme that divides time resources in terms of performance in a CR-heterogeneous network environment. It is noted from FIG. 15 that the proposed scheme outperforms the conventional scheme irrespective of the number of available channels.

A heterogeneous cellular network environment will be described below.

It is assumed that a frequency f1 in use for an MBS and an additional frequency f2 are available to each SBS and an internal network managed by each SBS may operate in both Time Division Duplexing (TDD) and Frequency Division Duplexing (FDD).

Figure 17:
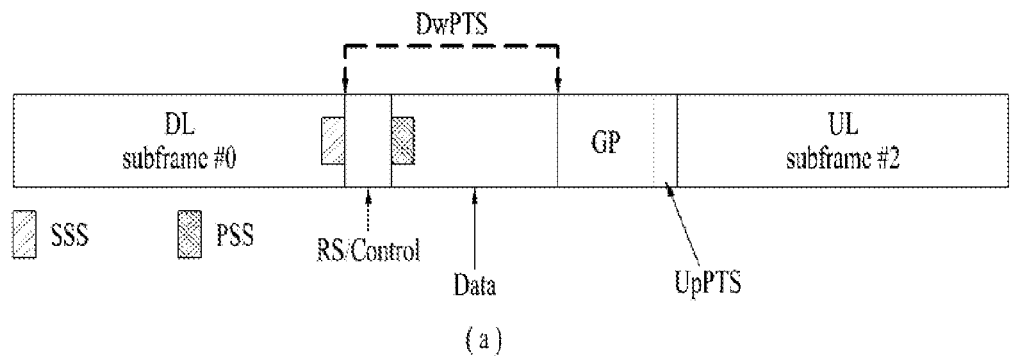
FIG. 17 illustrates a TDD radio frame structure and an UpLink/DownLink (UL/DL) configuration in an LTE/LTE-A system.
Figure 18:
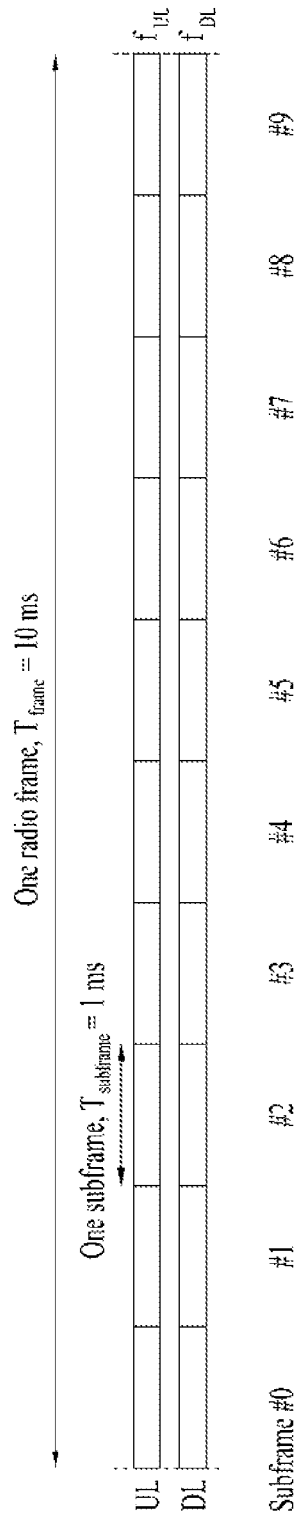
FIG. 18 illustrates a Frequency Division Duplexing (FDD) radio frame structure in an LTE/LTE-A system.

An LTE-TDD environment is illustrated as a heterogeneous network environment in FIG. 16. One radio frame includes 10 subframes and first and sixth subframes (subframe 0 and subframe 5) of each radio frame include synchronization signals by which a BS and a UE within the coverage of the BS are synchronized with each other. A subframe carrying DL-to-UL switching time information is referred to as a special subframe. In a 10-ms frame, second and seventh subframes are special subframes and in a 5-ms frame, a second subframe is a special subframe. A special subframe includes a Downlink Pilot Time Slot (DwPTS), a Guard Period (GP), and an Uplink Pilot Time Slot (UpPTS) and thus a UE and a BS may share a DL/UL switching timing based on this information. A UL/DL configuration available to the LTE TDD system is illustrated in FIG. 17. In general, every first subframe is allocated as a DL subframe and the DL switches to the UL in the subframe following a special subframe. Unlike DL-to-UL switching, the UL is switched to the DL based on a GP including information about the sum of a DL-to-UL switching time and a UL-to-DL switching time. Interference is measured about the channels f1 and f2 through $M_c$ antennas in $N_c$ subframes. The interference measurement period $N_c$ is determined within 10 ms (one radio frame) according to a node selection. For example, if the node wants to measure interference about all BSs and all frequency bands irrespective of a switching time, the interference measurement period may be set to (total number of channels×switching time) ms. Interference may be measured in $N_c$ contiguous subframes or in $N_c$ incontiguous subframes divided into smaller units. A channel having the least interference is selected based on the interference measurements and data is transmitted and received on DL and UL to and from nodes within a small cell through $M_T$ antennas during the remaining 10–$N_c$ ms period. From a second radio frame on, data is transmitted and received through $M_d$ antennas on a channel selected in the previous radio frame, simultaneously with interference measurement on the channels f1 and f2 through the $M_c$ antennas. Herein, interference is measured on the channel selected in the previous radio frame by removing a DL signal introduced into an interference measurer based on antenna isolation and self-interference cancellation in the DL mode. In the UL mode, an internal signal is removed from signals received through the $M_c$ antennas for coexistence management based on demodulated signals from the $M_d$ antennas and then interference is measured on external signals, or data is received through the total $M_T$ antennas without antenna partitioning, an internal network signal is demodulated and removed from the total received signals, and then interference is measured on external signals.

Figure 19:
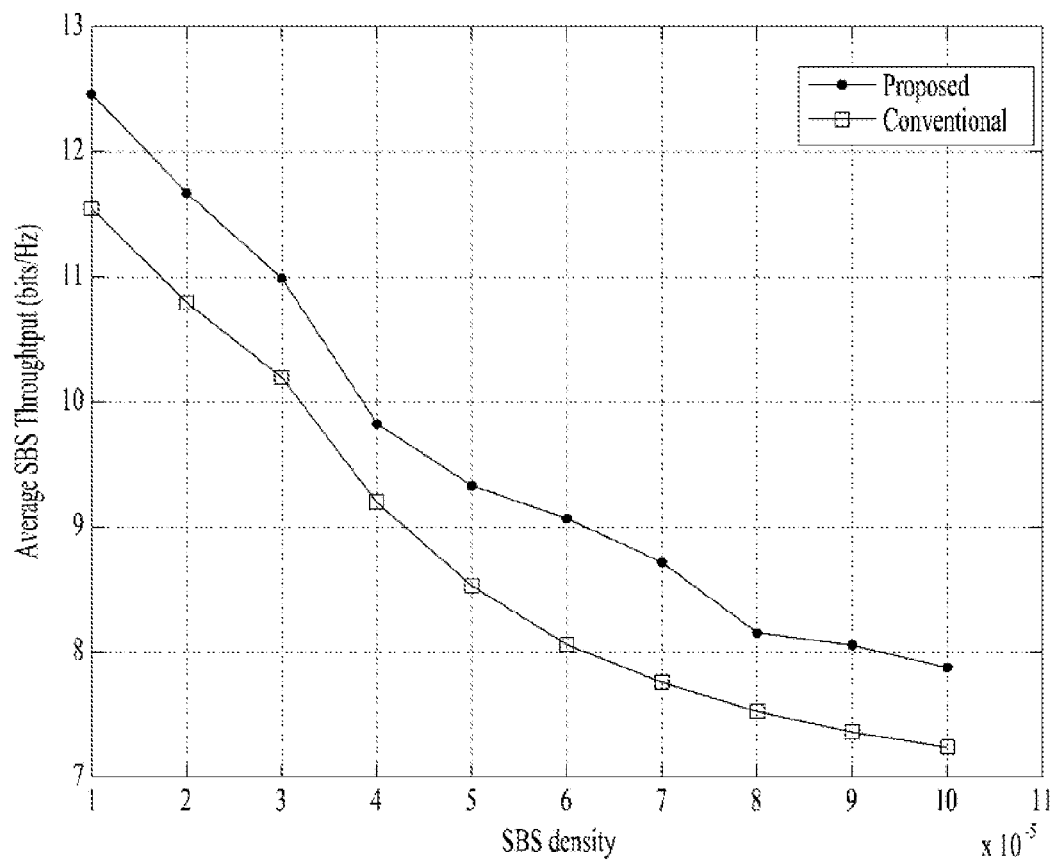
FIG. 19 is a graph comparing throughputs of a conventional technology with throughputs of an embodiment of the present invention.

An LTE-FDD environment as a heterogeneous cellular network environment is illustrated in FIG. 19. Like a TDD radio frame, one FDD frame includes 10 subframes. Since one frequency band f1 is divided into f1_DL, f1_guard band, and f1_UL for a DL and a UL, there is no special subframe in FDD. As in the TDD environment, interference is measured on the channels f1 and f2 through the $M_c$ antennas in the $N_c$ subframes and a channel having the least interference is selected based on the interference measurements. Data is transmitted to and received from nodes within a small cell through the $M_T$ antennas during the remaining time period 10–$N_c$ ms. From a second radio frame on, data is transmitted and received on the channel selected in the previous radio frame through the $M_d$ antennas, while interference is being measured on the channels f1 and f2 through the $M_c$ antennas. Interference is measured on the channel selected in the previous frame after a DL signal introduced into an interference measurer is removed by antenna isolation and self-interference cancellation in the f_DL band. In the f_UL band, an internal signal is removed from signals received through the $M_c$ antennas for coexistence management based on demodulated signals from the $M_d$ antennas and then interference is measured on external signals in order to prevent an internal network signal from serving as interference. Or signals are received through the total $M_T$ antennas, an internal network signal is demodulated and removed from the total received signals, and then interference is measured on external signals in the f1_UL band.

FIG. 19 is a graph illustrating average SBS throughputs versus SBS densities under the condition that there are two frequencies f1 and f2, the path-loss exponential values of two frequencies f1 and f2 are –3.4 and –4, respectively, the transmission powers of an MBS and an SBS are 46 dBm and 23 dBm, respectively, the number of transmission and reception antennas is 4, an antenna correlation coefficient is 0.5, in order to compare a scheme of dividing time resources and a proposed scheme, for channel selection of an SBS in a heterogeneous cellular network environment. In regard to a comprehensive tendency, it is noted that as an SBS density increases, the total amount of interference between SBSs increases, thereby decreasing an average SBS throughput. However, the proposed scheme also outperforms the conventional scheme irrespective of SBS density in the heterogeneous cellular network environment.

Figure 20:
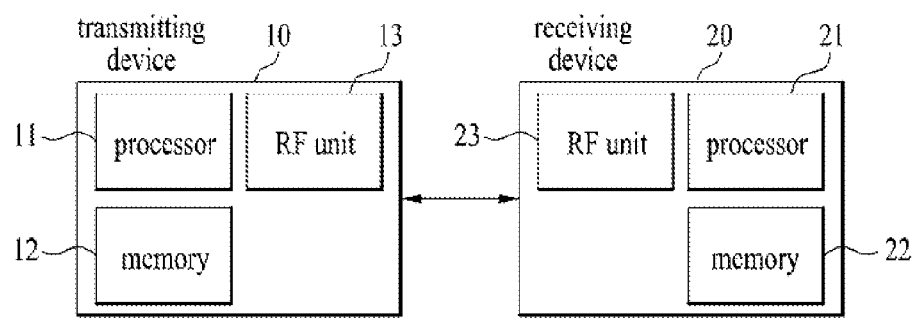
FIG. 20 is a block diagram of devices that can implement an embodiment(s) of the present invention.

FIG. 20 is a block diagram of devices configured to perform an embodiment(s) of the present invention. Referring to FIG. 20, a transmitting device 10 and a receiving device 20 include RF units 13 and 23 for transmitting or receiving information and/or data, signals, and messages, memories 12 and 22 for storing information related to communication in a wireless communication system, and processors 11 and 21 connected to components such as the RF units 13 and 23 and the memories 12 and 22 in terms of operations, for controlling the memories 12 and 22 and/or the RF units 13 and 23 to perform at least one of the foregoing embodiments of the present invention.

The memories 12 and 22 may store processing and control programs and may temporarily store input/output information. The memories 12 and 22 may be used as buffers.

The processors 11 and 21 provide overall control to each module in the transmitting device 10 and the receiving device 20. Particularly, the processors 11 and 21 may perform control functions to implement the present invention. The processors 11 and 21 may also be called controllers, microcontrollers, micro-processors, micro-computers, etc. The processors 11 and 21 may be configured in hardware, firmware, software, or a combination thereof. In a hardware configuration, the processors 12 and 22 may include Application Specific Integrated Circuits (ASICs), Digital Signal Processors (DSPs), Digital Signal Processing Devices (DSDPs), Programmable Logic Devices (PLDs), Field Programmable Gate Arrays (FPGAs), etc. In a firmware or software configuration, firmware or software may be implemented in the form of a module, a procedure, a function, etc. The firmware or software may be included in the processors 11 and 21, or stored in the memories 12 and 22 and executed by the processors 11 and 21.

The processor 11 of the transmitting device 10 encodes and modulates a transmission signal and/or data scheduled by the processor 11 or a scheduler connected to the processor 11 in predetermined coding and modulation schemes and transmits the coded and modulated signal and/or data to the RF unit 13. For example, the processor 11 converts a transmission data stream to K layers after demultiplexing, channel coding, scrambling, modulation, etc. The coded data stream is referred to as a codeword equivalent to a transport block being a data block provided by a Medium Access Control (MAC) layer. One transport block is encoded to one codeword and each codeword is transmitted in the form of one or more layers to a receiving device. The RF unit 13 may include an oscillator, for frequency upconversion. The RF unit 13 may include $N_t$ transmission antennas ($N_t$ is a positive integer).

The receiving device 20 reversely performs the signal process of the transmitting device 10. The RF unit 23 of the receiving device 20 receives a radio signal from the transmitting device 10 under the control of the processor 21. The RF unit 23 may include $N_r$ reception antennas ($N_r$ is a positive integer). The RF unit 23 downconverts the frequency of a signal received through each reception antenna to a baseband signal. The RF unit 23 may include an oscillator for frequency downconversion. The processor 21 may recover original data transmitted by the transmitting device 10 by decoding and demodulating radio signals received through the reception antennas.

The RF units 13 and 23 each include one or more antennas. Each of the RF units 13 and 23 corresponds to the afore-described network module. The antennas transmit signals processed by the RF units 13 and 23 or receive radio signals and provide the received signals to the RF units 13 and 23 under the control of the processors 11 and 21 according to an embodiment of the present invention. Antennas may be referred to as antenna ports. Each antenna may correspond to one physical antenna or may be configured as a combination of two or more physical antenna elements. A signal received through each antenna may not be decomposed further in the receiving device 20. A reference signal transmitted in correspondence with an antenna defines the antenna from the perspective view of the receiving device 20. The reference signal enables the receiving device 20 to perform channel estimation in relation to the antenna, irrespective of whether a channel is a single radio channel from one physical antenna or a composite channel from a plurality of physical antenna elements included in the antenna. That is, an antenna is defined in such a manner that a channel carrying a symbol from the antenna may be derived from a channel carrying a different symbol from the same antenna. If an RF unit supports MIMO that transmits and receives data through a plurality of antennas, the RF unit may be connected to two or more antennas.

In embodiments of the present invention, a UE or a relay operates as the transmitting device 10 on UL and as the receiving device 20 on DL. In embodiments of the present invention, a BS operates as the receiving device 20 on UL and as the transmitting device 10 on DL.

The afore-described embodiments of the present invention may be applied independently or two or more of them may be applied in combination to the specific configuration of a UE or a BS that functions as a receiving device or a transmitting device As is apparent from the above description of the embodiment(s) of the present invention, data throughput can be increased.

Furthermore, frequency resources can be efficiently used.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. The above embodiments are therefore to be construed in all aspects as illustrative and not restrictive. Therefore, the present invention intends not to limit the embodiments disclosed herein but to give a broadest range matching the principles and new features disclosed herein.

What is claimed is:

1. A method for performing frequency band sensing or data transmission and reception at a pico Base Station (BS) within the coverage of a macro BS in a wireless communication system, the method comprising:

determining the number of ($M_s$) antennas for frequency band sensing and the number ($M_d$) of antennas for data transmission and reception from among a plurality of ($M_{total}$) antennas of the pico BS and determining a duration for the frequency band sensing in a radio frame; and performing frequency band sensing or data transmission and reception according to the determined number of ($M_s$) antennas for the frequency band sensing, the determined number of ($M_d$) antennas for the data transmission and reception, and the determined duration for the frequency band sensing, wherein the number of ($M_s$) antennas for the frequency band sensing and the number of ($M_d$) antennas for the data transmission and reception are determined based on a data throughput of the pico BS and the duration for the frequency band sensing is determined based on the data throughput of the pico BS, and wherein the frequency band sensing and the data transmission and reception are performed simultaneously.

2. The method according to claim 1, further comprising transmitting and receiving data to and from a User Equipment (UE) using the determined number of ($M_S$) antennas for the frequency band sensing in the determined duration for the frequency band sensing.

3. The method according to claim 1, further comprising transmitting and receiving data to and from a User Equipment (UE) using the determined number of ($M_S$) antennas for the frequency band sensing and the determined number of ($M_d$) antennas for the data transmission and reception in a duration other than the determined duration for the frequency band sensing in the radio frame.

4. The method according to claim 1, wherein the determining comprises calculating a data throughput of the pico BS for each of all combinations of an available number of ($M_s$) antennas for frequency band sensing and an available number of ($M_d$) antennas for the data transmission and reception among the plurality of ($M_{total}$) antennas, and selecting a combination having a maximum data throughput.

5. The method according to claim 1, further comprising selecting a frequency band having the least interference based on a result of the frequency band sensing and performing frequency band sensing or data transmission and reception in the selected frequency band.

6. The method according to claim 1, the performing frequency band sensing comprising:

eliminating a downlink signal transmitted from the pico BS to a User Equipment (UE) from a downlink signal received in the antennas for the frequency band sensing, if the frequency band sensing is performed on a downlink; and eliminating an uplink signal transmitted from the UE to the pico BS from an uplink signal received in the antennas for the frequency band sensing, if the frequency band sensing is performed on an uplink.

7. A pico Base Station (BS) for performing frequency band sensing or data transmission and reception within the coverage of a macro BS in a wireless communication system, the pico BS comprising:

a Radio Frequency (RF) unit; and a processor configured to control the RF unit, wherein the processor is configured to determine the number of ($M_s$) antennas for frequency band sensing and the number of ($M_d$) antennas for data transmission and reception from among a plurality of ($M_{total}$) antennas of the pico BS, determines a duration for the frequency band sensing in a radio frame, and perform frequency band sensing or data transmission and reception according to the determined number of ($M_s$) antennas for the frequency band sensing, the determined number of ($M_d$) antennas for the data transmission and reception, and the determined duration for the frequency band sensing, wherein the number of ($M_s$) antennas for the frequency band sensing and the number of ($M_d$) antennas for the data transmission and reception are determined based on a data throughput of the pico BS and the duration for the frequency band sensing is determined based on the data throughput of the pico BS, and wherein the frequency band sensing and the data transmission and reception are performed simultaneously.

8. The pico BS according to claim 7, wherein the processor is further configured to transmit and receive data to and from a User Equipment (UE) through the determined number of ($M_S$) antennas for the frequency band sensing in the determined duration for the frequency band sensing.

9. The pico BS according to claim 7, wherein the processor is further configured to transmit and receive data to and from a User Equipment (UE) using the determined number of ($M_S$) antennas for the frequency band sensing and the determined number of ($M_d$) antennas for the data transmission and reception in a duration other than the determined duration for the frequency band sensing in the radio frame.

10. The pico BS according to claim 7, wherein when the processor is configured to determine the number of ($M_s$) antennas for the frequency band sensing and the number of ($M_d$) antennas for the data transmission and reception, the processor is configured to calculate a data throughput of the pico BS for all combinations of an available number of ($M_s$) antennas for the frequency band sensing and an available number of ($M_d$) antennas for the data transmission and reception among the plurality of ($M_{total}$) antennas, and select a combination having a maximum data throughput.

11. The pico BS according to claim 7, wherein the processor is further configured to select a frequency band having the least interference based on a result of the frequency band sensing and perform frequency band sensing or data transmission and reception in the selected frequency band.

12. The pico BS according to claim 7, wherein if the frequency band sensing is performed on a downlink, the processor is configured to eliminate a downlink signal transmitted from the pico BS to a User Equipment (UE) from a downlink signal received in the antennas for the frequency band sensing, and if the frequency band sensing is performed on an uplink, the processor is configured to eliminate an uplink signal transmitted from the UE to the pico BS from an uplink signal received in the antennas for the frequency band sensing.

* * * * *